United States Patent Office 2,951,819
Patented Sept. 6, 1960

2,951,819
POLYMER COMPOSITIONS COMPRISING AN ALKALI METAL BOROHYDRIDE AND STEARIC ACID AND PREPARATION OF CELLULAR RUBBER-LIKE ARTICLES THEREFROM
Robert C. Wade, Ipswich, and Phillip L. Blanchard, Medford, Mass., assignors to Metal Hydrides Incorporated, Beverly, Mass., a corporation of Massachusetts
No Drawing. Filed Mar. 6, 1958, Ser. No. 719,515
13 Claims. (Cl. 260—2.5)

This invention relates to the preparation of cellular articles from solid crude natural rubber and solid synthetic rubber-like materials as distinguished from an aqueous dispersion of an elastomeric material, such as natural rubber latex. Thus, the invention relates to the preparation of such articles by the so-called "dry" process. More particularly, the invention relates to the preparation of such articles by the so-called "dry" process wherein an alkali metal borohydride, such as sodium borohydride or potassium borohydride, serves as the blowing agent.

In the so-called "dry" process for preparing cellular articles, crude uncured rubber is broken down in conventional mixing equipment and then the other components, such as antioxidants, activators, accelerators, plasticizers and fillers are added and thereby uniformly mixed with the uncured rubber. Prior to further processing the above mixture is added to conventional warm-up equipment, such as a rubber mill, and the vulcanizing agents and blowing agent are thoroughly blended therewith. One commonly used blowing agent is sodium carbonate. "Celogen," which is a white crystalline powder chemically known as p,p,oxy bis(benzene sulfonyl hydrazide), is another compound used as a blowing agent. When the components are uniformly mixed, the composition is placed in molds, or spread between platens in the form of a sheet, and cured at a suitable curing temperature, such as between about 120° C. and 180° C. The curing heat decomposes the blowing agent to generate a gas to render the composition cellular.

A typical composition for preparing cellular articles by the so-called "dry" process comprises a desired amount of a blowing agent together with the following components in parts by weight:

| | Parts |
|---|---|
| Crude rubber | 100 |
| Hard clay | 30 |
| Whiting | 30 |
| Titanium dioxide | 5 |
| Stearic acid | 3 |
| Zinc oxide | 5 |
| Antioxidant (diphenyl amine) | 1 |
| Sulfur | 2.5 |
| Benzothiazyl disulfide | 0.6 |
| Light process oil | 30 |
| Diphenyl guanidine | 0.2 |

Sodium borohydride and potassium borohydride decompose in aqueous solutions containing an acidic catalyst and, consequently, have been used as foaming agents in the preparation of cellular articles from aqueous dispersions of natural rubber latex. However, prior to the present invention, it had been believed that these borohydrides were unsuitable for use as blowing agents in the preparation of cellular articles from crude uncured natural rubber or synthetic rubber-like materials by the "dry" process for two reasons. First, it was known that the temperatures at which these borohydrides decompose are considerably higher than the temperatures used in curing natural rubber and synthetic rubber-like compositions and, second, it was believed that no component either was present or could be introduced safely into such compositions which would cause decomposition of these borohydrides under the operating conditions of the "dry" process. The compound of the most acidic character present in such compositions was stearic acid. It was known that calcium hydride was substantially unaffected by molten stearic acid at temperatures as high as 120° C., as shown by United States Patent No. 2,513,997, and that calcium hydride is more sensitive to acids than either sodium borohydride or potassium borohydride.

The present invention is based upon our discovery that when crude uncured natural rubber or a synthetic rubber-like material, such as a styrene-butadiene copolymer, neoprene (polychloroprene), a synthetic rubber produced by copolymerization of isobutene with isoprene or butadiene in the proportion of about 98% of isobutene and about 2% of isoprene or butadiene known as "butyl rubber," an acrylonitrile-butadiene copolymer, silicone rubbers, and blends thereof, is mixed by the "dry" process with the usual compounding components comprising stearic acid, a vulcanizing or curing agent and sodium borohydride or potassium borohydride, and the mixture cured at the usual curing temperatures, the borohydride is substantially completely decomposed during the curing operation. These borohydrides not only serve as excellent blowing agents but also decrease the time required for effecting complete curing by 15 to 20 percent or more.

In the practice of the present invention, the amount of sodium borohydride or potassium borohydride used depends upon the amount of gas evolution desired and may vary between about 0.2 to 0.5 part by weight. The usual proportion of stearic acid may be employed and may vary between about 2 to 4 parts by weight. The composition of the invention prior to curing may include in usual proportions an activator, such as zinc oxide, the usual accelerators, another plasticizer when desirable an antioxidant when desirable, pigments and fillers such as carbon black, clay, whiting and talc, in addition to the sodium borohydride or potassium borohydride, the uncured rubber base material and the vulcanizing or curing agent, such as sulfur or sulfur derivative. When an inert diluent is used, such as clay, whiting, talc or pigments, we prefer to blend the potassium borohydride or sodium borohydride with at least a portion thereof and then add this blend together with the other components to the uncured natural rubber or synthetic rubber-like material as the latter is passed between the rolls of the mixing mill. For curing, any usual curing temperature may be used, such as a temperature between about 120° C. and 180° C. but preferably about 160° C.

The invention is illustrated further by the following specific examples in each of which the components were uniformly mixed by passing the uncured rubber base material between the rolls of a conventional rubber mixing mill while adding the other components thereto, the borohydride being blended with a portion of the inert diluent before being added.

Example 1

The uncured uniformly mixed material had the following composition in parts by weight:

| | Parts |
|---|---|
| Styrene-butadiene rubber | 100 |
| Carbon black | 60 |
| Stearic acid | 3 |
| Zinc oxide | 5 |
| Antioxidant (diphenyl amine) | 1 |
| "Neophax A" (vulcanized soya bean oil) | 5 |
| Light process oil | 30 |
| Sulfur | 3 |
| Benzothiazyl disulfide | 1 |
| Diphenyl guanidine | 0.3 |
| Potassium borohydride | 0.35 |

This mixture was spread between platens spaced 3/8 of an inch apart and heated at a temperature of 160° C. until completely cured, the time required being 8 minutes.

Another identical mixture was prepared except that, in place of the borohydride, 7.0 parts by weight of "Celogen" was used. This mixture also was spread between platens spaced 3/8 of an inch apart and heated at a temperature of 160° C. until completely cured, the time required being about 9.2 minutes.

The expansion of both of these compositions was about 200 percent and both had an excellent cell structure.

*Example 2*

The uncured uniformly mixed material had the following composition in parts by weight:

| | Parts |
|---|---|
| Crude natural rubber | 100 |
| Hard clay | 30 |
| Whiting | 30 |
| Titanium dioxide | 5 |
| Stearic acid | 3 |
| Zinc oxide | 5 |
| Antioxidant (diphenyl amine) | 1 |
| Sulfur | 2.5 |
| Light process oil | 30 |
| Benzothiazyl disulfide | 0.6 |
| Diphenyl guanidine | 0.2 |
| Potassium borohydride | 0.35 |

This mixture was spread between platens spaced 3/8 of an inch apart and heated at a temperature of 160° C. until completely cured, the time required being about 8 minutes.

Another identical mixture was prepared except that, in place of the borohydride, 7.0 parts by weight of "Celogen" was used. This mixture also was spread between platens spaced 3/8 of an inch apart and heated at a temperature of 160° C. until completely cured, the time required being about 15 percent longer than the composition containing the borohydride.

The expansion of both of these compositions was about 200 percent and both had an excellent cell structure.

*Example 3*

The uncured uniformly mixed material had the following composition in parts by weight:

| | Parts |
|---|---|
| Synthetic rubber produced by copolymerization of isobutene with isoprene or butadiene in the proportion of about 98% of isobutene and about 2% of isoprene or butadiene | 100 |
| Channel black | 60 |
| Zinc oxide | 5 |
| Light process oil | 30 |
| Stearic acid | 3 |
| Sulfur | 2 |
| Benzothiazyl disulfide | 0.5 |
| Tetramethyl thiuram disulfide | 1 |
| Potassium borohydride | 0.35 |

The mixture was spread between platens spaced 3/8 of an inch apart and heated at a temperature of 160° C. until completely cured, the time required being about 10 minutes.

Another identical mixture was prepared except that, in place of the borohydride, 7.0 parts by weight of "Celogen" was used. This mixture also was spread between platens spaced 3/8 of an inch apart and heated at a temperature of 160° C. until completely cured, the time required being about 20 percent longer than the composition containing the borohydride.

The expansion of both of these compositions was about 200 percent and both had an excellent cell structure.

We claim:

1. The method of making cellular articles which comprises mixing a solid uncured rubber-like material selected from the group consisting of crude natural rubber, a styrene-butadiene copolymer, polychloroprene, a butyl rubber produced by polymerizing isobutene with a substance selected from the group consisting of butadiene and isoprene in the proportion of about 98% of isobutene and about 2% of said selected substance, an acrylonitrile-butadiene copolymer, silicone rubber and blends thereof with rubber compounding components comprising a vulcanizing agent, stearic acid and a borohydride selected from the group consisting of sodium borohydride and potassium borohydride, said borohydride and stearic acid being present in the mixture in amounts between about 0.2 to 0.5 part and about 2 to 4 parts by weight respectively, and then heating the mixture at a temperature between about 120° C. and 180° C. until the mixture is substantially completely cured.

2. The method as claimed by claim 1 wherein said rubber-like material comprises essentially crude natural rubber.

3. The method as claimed by claim 1 wherein said rubber-like material comprises essentially styrene-butadiene copolymer.

4. The method as claimed by claim 1 wherein said rubber-like material comprises essentially polychloroprene.

5. The method as claimed by claim 1 wherein said rubber-like material comprises essentially acrylonitrile-butadiene copolymer.

6. The method as claimed by claim 1 wherein said rubber-like material comprises essentially silicone rubber.

7. The method as claimed by claim 1 wherein said borohydride is blended with an inert solid before being mixed with said rubber-like material.

8. A composition comprising a solid uncured rubber-like material, a vulcanizing agent, stearic acid and a borohydride selected from the group consisting of sodium borohydride and potassium borohydride, said rubber-like material being selected from the group consisting of crude natural rubber, a styrene-butadiene copolymer, polychloroprene, a butyl rubber produced by polymerizing isobutene with a substance selected from the group consisting of butadiene and isoprene in the proportion of about 98% of isobutene and about 2% of said selected substance, an acrylonitrile-butadiene copolymer, silicone rubber and blends thereof, said borohydride and stearic acid being present in the composition in amounts between about 0.2 to 0.5 part and 2 to 4 parts by weight respectively.

9. A composition as claimed by claim 8 wherein said rubber-like material comprises essentially crude natural rubber.

10. A composition as claimed by claim 8 wherein said rubber-like material comprises essentially styrene-butadiene copolymer.

11. A composition as claimed by claim 8 wherein said rubber-like material comprises essentially polychloroprene.

12. A composition as claimed by claim 8 wherein said rubber-like material comprises essentially acrylonitrile-butadiene copolymer.

13. A composition as claimed by claim 8 wherein said rubber-like material comprises essentially silicone rubber.

References Cited in the file of this patent

UNITED STATES PATENTS

| 2,758,980 | Talalay et al. | Aug. 14, 1956 |
| 2,798,055 | Sullivan | July 2, 1957 |
| 2,833,731 | Pfisterer | May 6, 1958 |